United States Patent [19]

Hart

[11] Patent Number: 5,524,573
[45] Date of Patent: Jun. 11, 1996

[54] DOG TRANSPORTATION BOX

[76] Inventor: James E. Hart, 4130 Del Rosa Ave., Moss Point, Miss. 39563

[21] Appl. No.: 409,416

[22] Filed: Mar. 24, 1995

[51] Int. Cl.6 .................................... A01K 1/02
[52] U.S. Cl. .................................... 119/489
[58] Field of Search ........................ 119/19, 17

[56] References Cited

U.S. PATENT DOCUMENTS

| | | | |
|---|---|---|---|
| 2,470,223 | 5/1949 | Powels | 119/19 |
| 3,225,738 | 12/1965 | Palencia | 119/17 |
| 4,220,119 | 9/1980 | Albright | 119/19 |
| 4,256,056 | 3/1981 | Sou | 119/19 |
| 4,869,206 | 9/1989 | Spina | 119/17 |
| 5,144,910 | 9/1992 | Darby | 119/19 |
| 5,349,924 | 9/1994 | Hooper, Jr. | 119/9 |
| 5,357,900 | 10/1994 | Ho | 119/19 |

*Primary Examiner*—Todd E. Manahan

[57] ABSTRACT

A dog transportation device comprised of a rigid plastic container having a bottom wall with a periphery extending upwards from the bottom wall to define a hollow interior and with the periphery formed of a pair of end walls with a pair of long walls extended therebetween. One of the end walls has a pair of door holes disposed thereon for allowing access into the interior. The container also has a removable top wall extended between the walls at a location above the interior. A separating wall extends across the interior to thereby define a first holding compartment in communication with one of the door holes and a second holding department in communication with the other door hole. A pair of closeable doors are hingably secured within the door holes.

1 Claim, 3 Drawing Sheets

DOG TRANSPORTATION BOX

BACKGROUND OF THE INVENTION

1. Field of the Invention

The present invention relates to a dog transportation box and more particularly pertains to housing and transporting dogs with a dog transportation box.

2. Description of the Prior Art

The use of dog transportation boxes or crates are known in the prior art. More specifically, dog transportation boxes or crates heretofore devised and utilized for the purpose of housing and transporting dogs are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 282,880 to Barati discloses an animal crate. U.S. Pat. No. Des. 330,443 to Darby discloses a dog transportation box. U.S. Pat. No. Des. 334,444 to Darby discloses a combined dog transportation box and storage container. U.S. Pat. 3,773,017 to Johannes discloses an animal crate for pick-up trucks. U.S. Pat. No. 5,144,910 to Darby discloses a dog transportation box with removable side wall and method. U.S. Pat. No. 5,233,939 to Randall discloses an animal cage.

While these devices fulfill their respective, particular objective and requirements, the aforementioned patents do not describe a dog transportation box that includes two holding compartments for carrying dogs and also includes a storage compartment for holding hunting-related supplies and equipment.

In this respect, the dog transportation box according to the present invention substantially departs from the conventional concepts and designs of the prior art, and in doing so provides an apparatus primarily developed for the purpose of housing and transporting dogs.

Therefore, it can be appreciated that there exists a continuing need for new and improved dog transportation box which can be used for housing and transporting dogs. In this regard, the present invention substantially fulfills this need.

SUMMARY OF THE INVENTION

In the view of the foregoing disadvantages inherent in the known types of dog transportation boxes or crates now present in the prior art, the present invention provides an improved dog transportation box. As such, the general purpose of the present invention, which will be described subsequently in greater detail, is to provide a new and improved dog transportation box and method which has all the advantages of the prior art and none of the disadvantages.

To attain this, the present invention essentially comprises, in combination, a rigid plastic container. The container has a generally rectangular horizontal cross section. The container includes a horizontal planar rectangular bottom wall with a periphery extended upwards therefrom to define a hollow interior. The periphery is formed of a pair of opposed vertical planar end walls with a pair of vertical planar rectangular long walls extended therebetween. The long walls of the container are secured by a snap connection to the end walls. Each long wall has a bottom edge connected to the bottom wall, a top edge, a pair of opposed side edges extended therebetween, and a plurality of elongated rectangular slots formed thereon at a location adjacent to the top edge thereof. Each slot allows the interior to be ventilated in one mode of operation. Each slot further serves as a handle for carrying the container in another mode of operation. Each end wall has a straight bottom edge, a curved upper edge, and a pair of opposed straight side edges extended therebetween. One of the end walls further has a pair of door holes disposed thereon for allowing access within the interior. The container further includes a removable horizontal planar rectangular top wall extended between the top edges of the long walls and an upper extent of each end wall at a location above the interior, a horizontal planar rectangular grated floor extended between the walls at a location offset above the bottom wall to thereby create a collection bin therebelow, and a vertical planar rectangular separating wall extended between the top wall and the floor to thereby define a first holding compartment in communication with one of the door holes and a second holding compartment in communication with the other door hole.

A curved lid is included and hingably coupled to one of the long walls of the container. The lid is positionable over the top wall to thereby create a storage space with a crescent-shaped cross section. A pair of spaced parallel vertical planar dividing walls is included and extended upwards from the top wall of the container to thereby divide the storage space into three storage bins. Each dividing wall further includes a slot disposed thereon for allowing communication between adjacent storage bins. A lid latch mechanism is provided and coupled between the lid and the long wall of the container for securing the lid in a closed position over the storage space. A pair of parallel longitudinally positioned rails is included and extended upwards from the lid. Lastly, a pair of doors is included. Each door is hingably secured within each door hole of the container. Each door has a peripheral border, a plurality of vertical bars extended across the border, and a door latch mechanism coupled between the border and the associated end wall for securing the door in a closed position.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dog transportation box which has all the advantages of the prior art dog transportation boxes or crates and none of the disadvantages.

It is another object of the present invention to provide a new and improved dog transportation box which may be easily and efficiently manufactured and marketed.

It is a further object of the present invention to provide a new and improved dog transportation box which is of durable and reliable construction.

An even further object of the present invention is to provide a new and improved dog transportation box which is susceptible of a low cost of manufacture with regard to both materials and labor, and which accordingly is then susceptible of low prices of sale to the consuming public, thereby making such a dog transportation box economically available to the buying public.

Still yet another object of the present invention is to provide a new and improved dog transportation box which provides in the apparatuses and methods of the prior art some of the advantages thereof, while simultaneously overcoming some of the disadvantages normally associated therewith.

Even still another object of the present invention is to provide a new and improved dog transportation box for housing and transporting dogs.

Lastly, it is an object of the present invention to provide a new and improved dog transportation box comprising a rigid plastic container including a bottom wall with a periphery extended upwards from the bottom wall to define a hollow interior and with the periphery formed of a pair of end walls with a pair of long walls extended therebetween and with one of the end walls having a pair of door holes disposed thereon for allowing access within the interior, the container further including a removable top wall extended between the walls at a location above the interior, a separating wall extended across the interior to thereby define a first holding compartment in communication with one of the door holes and a second holding compartment in communication with the other door hole; and a pair of closeable doors with the doors separately hingably secured within the door holes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
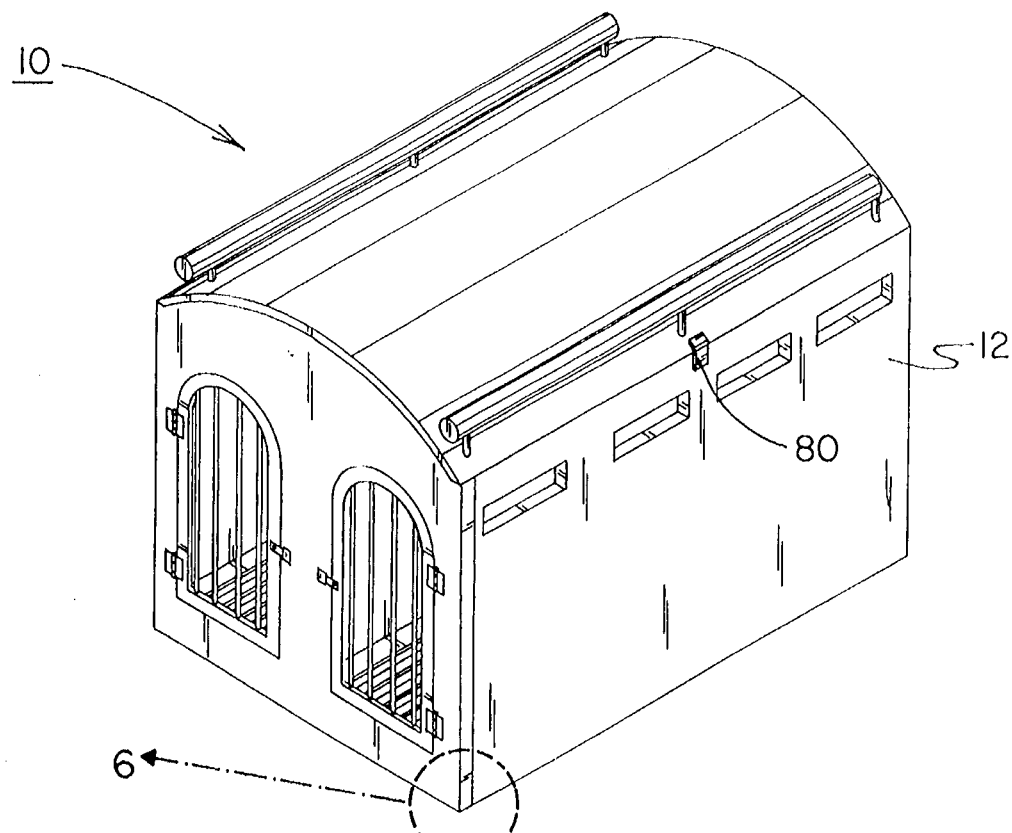
FIG. 1 is a perspective view of the preferred embodiment constructed in accordance with the principles of the present invention.

With reference now to the drawings, and in particular, to FIG. 1 thereof, the preferred embodiment of the new and improved dog transportation box embodying the principles and concepts of the present invention and generally designated by the reference number 10 will be described.

The present invention comprises a plurality of components. In their broadest context, such components include a container, lid, dividing walls, and doors. Such components are individually configured and correlated with respect to each other to provide a means for housing and transporting dogs.

Specifically, the present invention includes a container 12. The container is formed of a rigid impact-resistant plastic. The container has a generally rectangular horizontal cross-section. The container includes a horizontally positioned bottom wall 14. The bottom wall is planar and rectangular in structure. A periphery 16 is extended perpendicularly upwards from the bottom wall to thereby define a hollow box-shaped interior 18. The periphery is formed of a pair of opposed vertical planar end walls 20 with a pair of opposed vertical planar rectangular long walls 22 extended therebetween. The long walls are removably secured by a snap connection to the end walls with snap fasteners 24 secured within snap fastener slots 26. Each long wall has a bottom edge 28 connected to the bottom wall, a top edge 30 with a lip 32 projected perpendicularly outwards therefrom toward the interior, and a pair of opposed side edges 34 extended therebetween. In addition, a plurality of elongated horizontally aligned and rectangular slots 36 are formed on each long wall at a location adjacent to the top edge 30. Each slot allows the interior 18 to be ventilated in one mode of operation. The slots also serve as handles for carrying the container in another mode of operation.

Each end wall has a straight bottom edge 40, a curved upper edge 42, and a pair of opposed straight side edges 44 extended therebetween. One of the end walls also includes a pair of door holes 46, 48 disposed thereon. Each door hole is bounded by a straight bottom edge, a curved top edge, and a pair of opposed side edges extended therebetween. The door holes allow access within the interior 18. They are sized for allowing a dog to pass freely.

Figure 5:
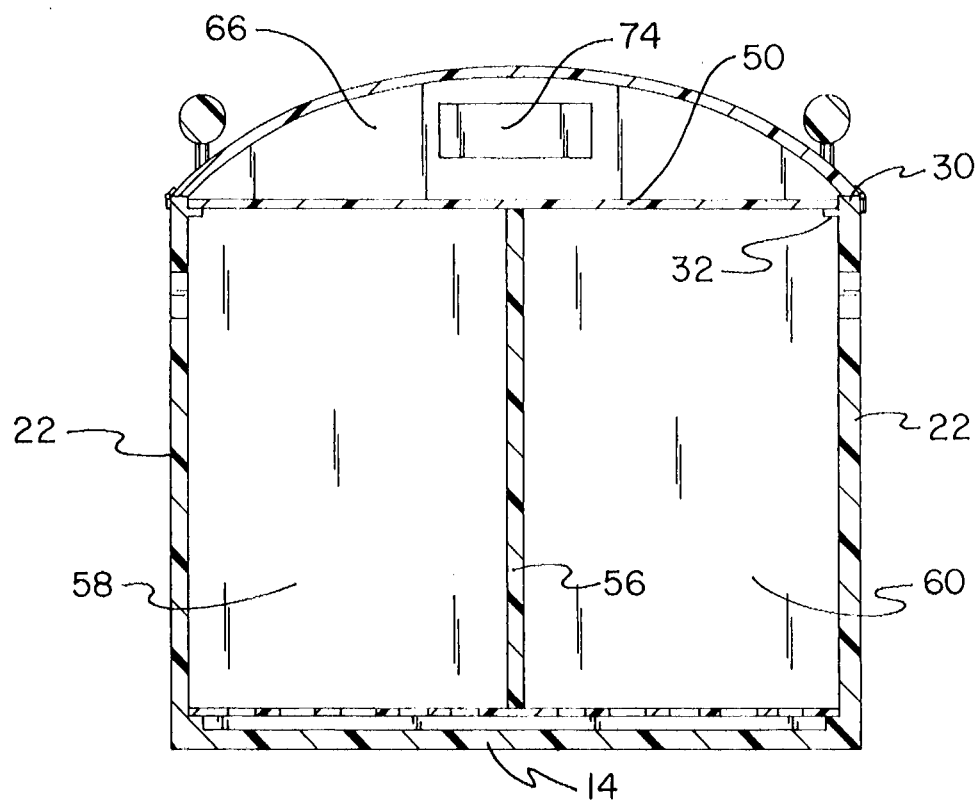
FIG. 5 is a cross-sectional view of the present invention taken along the line 5—5 of FIG. 4.
Figure 6:
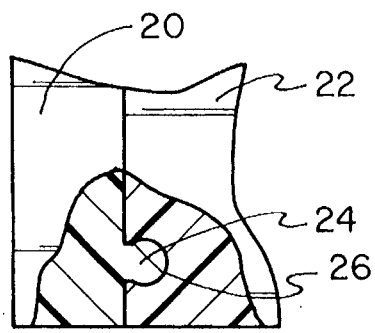
FIG. 6 is an enlarged fragmentary cross-sectional view of the removable coupling of one of the end walls to one of the side walls.
Figure 7:
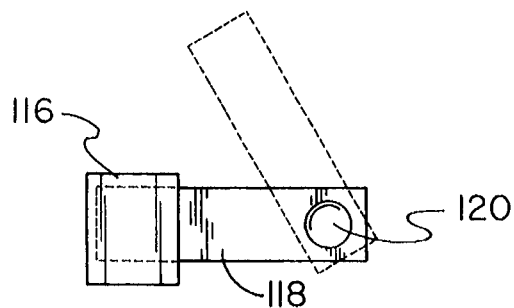
FIG. 7 is an enlarged side-elevational view of one of the door latches of the present invention.
Figure 8:
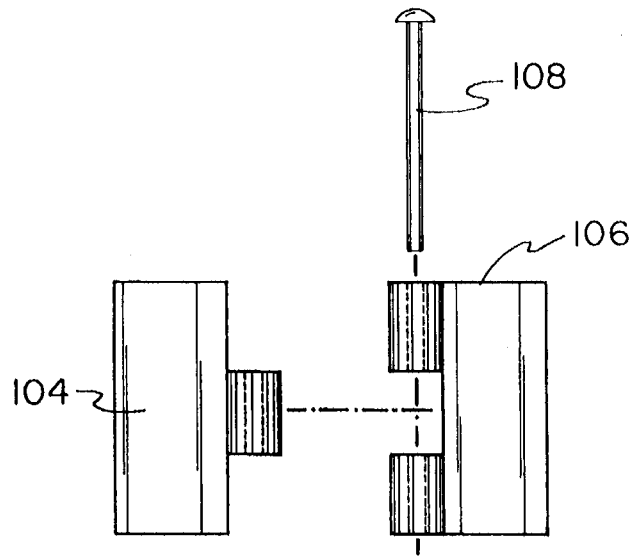
FIG. 8 is an exploded side-elevational view of the hingable coupling of one of the doors to the corresponding end wall of the present invention.

The container also includes a removable and horizontally positioned top wall 50. The top wall is planar and rectangular in structure. It is extended between the top edges 30 of the long walls and an upper extent of each end wall 20 at a location above the interior. The top wall rests upon the lips 32 as shown in FIG. 5. A horizontal, planar and rectangular grated floor 52 is extended and removably coupled between the walls 20, 22. The floor is located at a position offset directly above the bottom wall to thereby create a box-shaped elongated collection bin 54 therebelow. The collection bin is used for collecting waste and feces passing through the grated floor from dogs held within the interior 18. A vertical planar rectangular separator wall 56 is also provided. The separating wall is extended between the top wall and the floor to thereby define a first box-shaped holding compartment 58 and a second box-shaped holding compartment 60 as shown in FIG. 5. The first holding compartment is in communication with door hole 46, and the second holding compartment is in communication with the other door hole 48.

Figure 2:
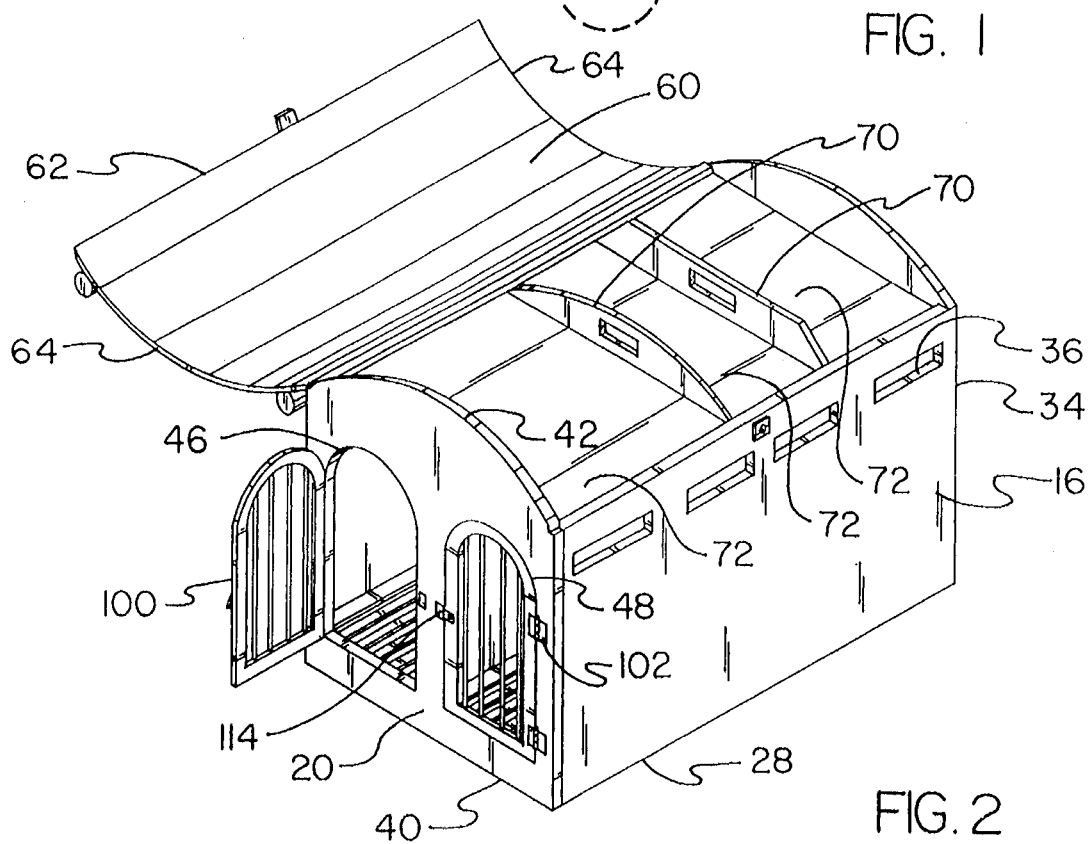
FIG. 2 is a perspective view of the present invention with its lid and one of its doors opened.

A rigid plastic curved lid 60 is coupled to one of the long walls of the container as shown in FIG. 2 with pinned hinges. The lid includes a pair of long edges 62 with a pair of short edges 64 extended therebetween. The lid is positionable over the top wall 50 to thereby create a storage space 66 as shown in FIG. 5. The storage space has a generally crescent-shaped cross-section. A pair of spaced, parallel, and vertical dividing walls 70 are included. The dividing walls are formed of rigid plastic. The walls 70 are coupled to and extended perpendicularly upwards from the top wall of the container and positioned such that they are parallel with the end walls. Each dividing wall is generally planar in structure. One of the dividing walls has a generally trapezoidal shape while the other dividing wall has a general crescent-shape. The dividing walls divide the storage space 66 into three storage bins 72. Each dividing wall also includes a slot 74 disposed thereon. The slots allow communication between adjacent storage bins. The slots are also generally axially aligned for allowing an elongated weapon such as a rifle to be disposed therein in a carrying configuration.

A lid latch mechanism 80 is coupled between the lid 60 and one of the long walls 22 of the container as shown in FIG. 1. The lid latch mechanism is used for securing the lid in a closed position over the storage space 66. The lid latch mechanism can also have a lock secured thereto for locking the lid in place.

A pair of parallel and longitudinally positioned rails 90 are extended upwards from the lid. The rails are formed of a rigid plastic. Each rail includes a horizontally positioned and elongated post with several pegs extended downwards therefrom. The pegs of each rail are coupled to the lid at a location generally aligned with one of its long edges 62. The rails in combination may be used for strapping killed game such as deer or birds upon the lid of the present invention for ready transport from one location to another.

Figure 3:
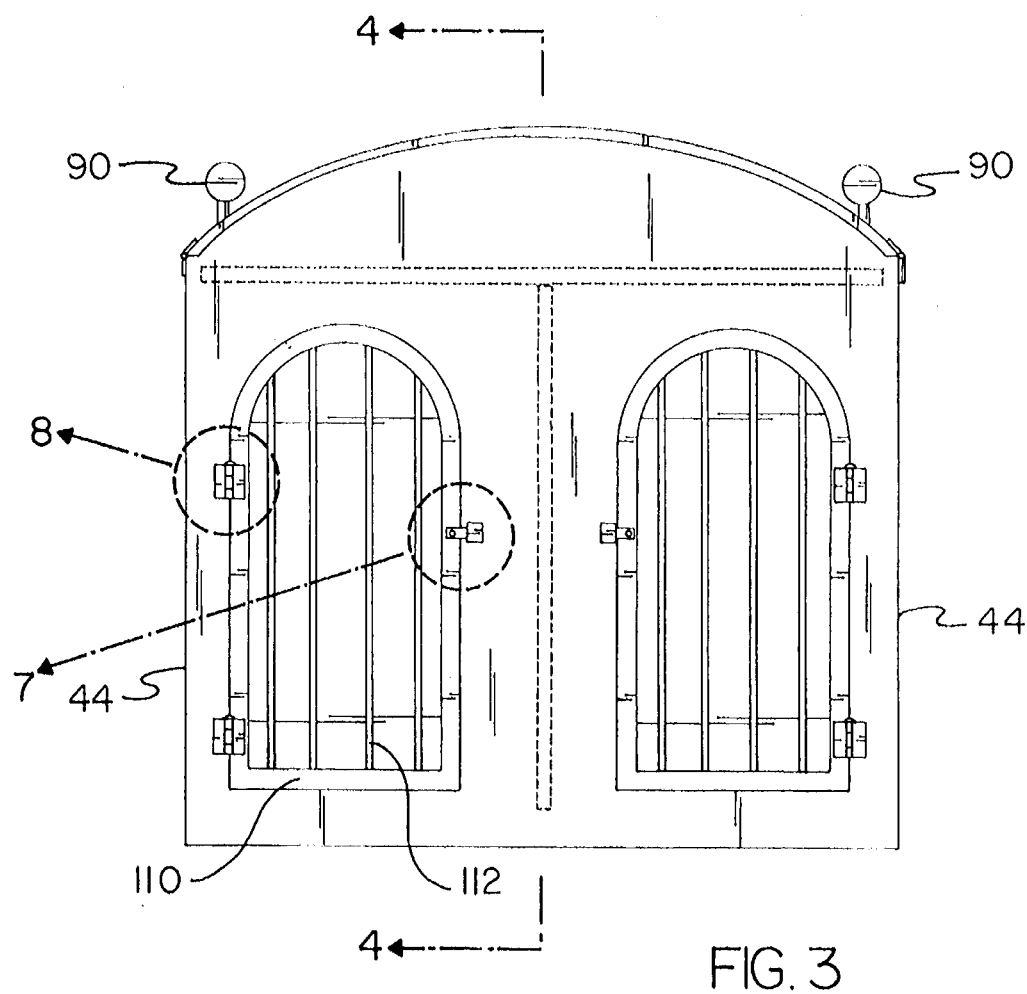
FIG. 3 is a side-elevational view of the preferred embodiment of the present invention.
Figure 4:
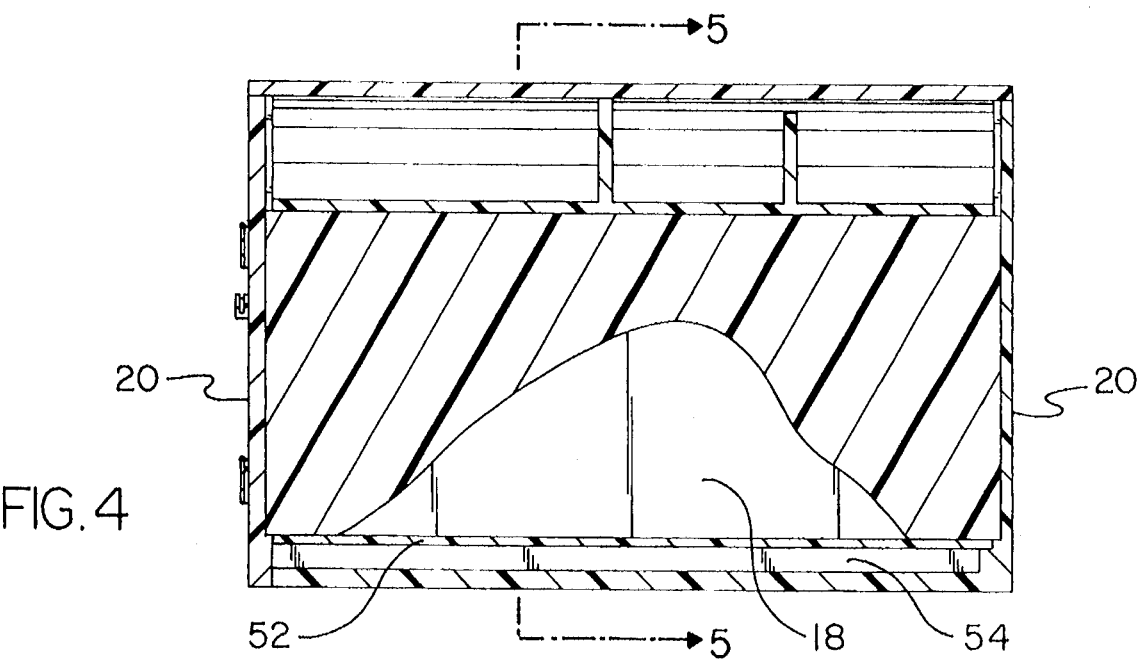
FIG. 4 is a cross-sectional view of the present invention taken along the line 4—4 of FIG. 3.

Lastly, a pair of rigid plastic doors 100 are provided. Each door is secured within a door hole 46, 48 and openable through action of a hinge 102. Each hinge is formed of a first member 104, a second member 106, and a pin 108 removably secured therebetween. This type of hinge is also used for coupling the lid 60 to the container. As best illustrated in FIG. 3, each door includes a peripheral border 110 conforming with a peripheral extent of one of the door holes, a plurality of vertical bars 112 extended across the border, and a door latch mechanism 114 coupled between the border and the associated end wall. The door latch mechanism includes a bracket 116, a rectangular planar bar 118 insertable within the bracket, and a fastener 120 for pivotally coupling the bar 118 to the end wall. The door latch mechanism is used for securing the door in a closed position.

The present invention is designed for easily transporting dogs. It is available in a small size wherein its cross-section is about 2½ feet by 5 feet, a medium size wherein its cross-section is about 3 feet by 5 feet, and a large size wherein its cross-section is about 4 feet by 5½ feet. The present invention can be used for hunting, breeding, or other such animal-related activities. The present invention can also be used in lieu of a dog house. The present invention is made of a rigid impact-resistant injection molded plastic that snaps together and comes apart for easy cleaning and transportation. The top wall, floor, and end walls can detach. Alternatively, the bottom wall, long walls, and end wall with no door holes thereon can be permanently affixed to add more stability. A plastic or stainless steel pin secures the hinges that the plastic doors swing on. There is also a metal or plastic latch for securing each of the doors. Because hunters usually transport more than one dog, the present invention is separated into two halves. Vents provide circulation to each holding compartment. The vents may also be used as a handle for carrying the present invention. The present invention may be fashioned in a variety of colors. The present invention would be especially useful during duck, quail, or racoon hunting. The rails atop the lid of the present invention may be used for securing game thereupon after it has been shot such as deer, birds, or the like. The floor of the present invention is of a grated design that allows urine or feces of dogs to fall through for easy removal. A catch tray may be installed under the floor for readily collecting such feces. The catch tray can be slidably inserted and removed from the collection bin through a slot formed on one of the walls.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A dog transportation box for housing and transporting dogs comprising, in combination:

a rigid plastic container with a generally rectangular horizontal cross section, the container including a horizontal planar rectangular bottom wall with a periphery extended upwards therefrom to define a hollow interior and with the periphery formed of a pair of opposed vertical planar end walls with a pair of vertical planar rectangular long walls extended therebetween and with the long walls secured to the end walls by a snap connection whereby the snap connection not being visible when the container is assembled, each long wall having a bottom edge connected to the bottom wall, a top edge, a pair of opposed side edges extended therebetween, and a plurality of elongated rectangular slots formed thereon at a location adjacent to the top edge thereof and with each slot allowing the interior to be ventilated in one mode of operation and serving as a handle for carrying the container in another mode of operation, each end wall having a straight bottom edge, a curved upper edge, and a pair of opposed straight side edges extended therebetween and with one of the end walls further having a pair of door holes disposed thereon for allowing access within the interior, the container further including a removable horizontal planar rectangular top wall extended between the top edges of the long walls and an upper extent of each end wall at a location above the interior, a horizontal planar rectangular grated floor extended between the walls at a location offset above the bottom wall to thereby create a collection bin therebelow, and a vertical planar rectangular separating wall extended between the top wall and the floor to thereby define a first holding compartment in communication with one of the door holes and a second holding compartment in communication with the other door hole;

a rigid plastic curved lid hingably coupled to one of the long walls of the container and positionable over the top wall to thereby create a storage space with a crescent-shaped cross section:

a pair of rigid plastic spaced parallel vertical planar dividing walls extended upwards from the top wall of the container to thereby divide the storage space thereof into three storage bins with each dividing wall further including a slot disposed thereon for allowing communication between the adjacent storage bins;

lid latch means coupled between the lid and one of the long walls of the container for securing the lid in a closed position over the storage space;

a pair of rigid plastic parallel longitudinally positioned rails extended upwards from the lid; and a pair of rigid plastic doors with each door hingably secured within a separate door hole of the container and with each door having a peripheral border, a plurality of vertical bars extended across the border, and door latch means coupled between the border and the associated end wall for securing the door in a closed position.

* * * * *